(12) United States Patent
Mayounove et al.

(10) Patent No.: US 12,503,254 B2
(45) Date of Patent: Dec. 23, 2025

(54) OMNIDIRECTIONAL PROPELLED VEHICLE WITH MINIMAL OVERALL DIMENSIONS

(71) Applicant: AERIX SYSTEMS, Merignac (FR)

(72) Inventors: Hugo Mayounove, Merignac (FR); Clément Picaud, Merignac (FR)

(73) Assignee: AERIX SYSTEMS, Merignac (FR)

( * ) Notice: Subject to any disclaimer, the term of this patent is extended or adjusted under 35 U.S.C. 154(b) by 0 days.

(21) Appl. No.: 18/849,351

(22) PCT Filed: Mar. 21, 2023

(86) PCT No.: PCT/EP2023/057123
§ 371 (c)(1),
(2) Date: Sep. 20, 2024

(87) PCT Pub. No.: WO2023/180270
PCT Pub. Date: Sep. 28, 2023

(65) Prior Publication Data
US 2025/0019096 A1    Jan. 16, 2025

(30) Foreign Application Priority Data

Mar. 22, 2022 (FR) .................................. FR2202536

(51) Int. Cl.
*B64U 10/14* (2023.01)
*B64U 30/294* (2023.01)

(52) U.S. Cl.
CPC ........... *B64U 10/14* (2023.01); *B64U 30/294* (2023.01)

(58) Field of Classification Search
CPC ...... B64U 10/14; B64U 30/294; B64U 30/24; B64U 30/297; B64U 50/19
See application file for complete search history.

(56) References Cited

U.S. PATENT DOCUMENTS 5,226,350 A * 7/1993 Cycon .................... B64U 30/26
416/129
5,340,279 A * 8/1994 Cycon .................... B64U 10/13
416/134 A (Continued)

FOREIGN PATENT DOCUMENTS

| CN | 108515822 | * | 9/2018 | ................ B60F 5/20 |
| CN | 108515822 A | | 9/2018 | |
| CN | 110697035 A | | 1/2020 | |

*Primary Examiner* — Medhat Badawi
(74) *Attorney, Agent, or Firm* — Greer, Burns & Crain, Ltd.

(57) ABSTRACT

The invention relates to a propelled vehicle including: a chassis, a first shaft comprising a crown that is rotationally symmetrical about a first axis and rotatably mounted on the chassis about the first axis of rotation, a first drive system connected to the first shaft and capable of rotating the first shaft about the first axis, which drive system includes a second shaft rotatably mounted on the first shaft about a second axis of rotation orthogonal to the first axis of rotation, the second shaft being supported at two separate points on the first shaft, the points defining the second axis of rotation, and the second shaft supporting at least one propulsion unit of the vehicle, and a second drive system connected to the second shaft and capable of rotating the second shaft about the second axis of rotation.

15 Claims, 7 Drawing Sheets

(56) References Cited

U.S. PATENT DOCUMENTS

| | | | | |
|---|---|---|---|---|
| 5,351,913 | A * | 10/1994 | Cycon | B64U 50/20 |
| | | | | 416/115 |
| 5,364,230 | A * | 11/1994 | Krauss | B64C 27/605 |
| | | | | 416/138 |
| 9,199,733 | B2 * | 12/2015 | Keennon | G05D 1/005 |
| 9,511,859 | B2 * | 12/2016 | Keennon | B64C 27/59 |
| 9,650,135 | B2 * | 5/2017 | Keennon | B64C 11/20 |
| 10,112,707 | B1 * | 10/2018 | Howard | B64U 10/17 |
| 10,329,025 | B2 * | 6/2019 | Keennon | B64C 27/04 |
| 10,870,495 | B2 * | 12/2020 | Keennon | B64C 29/0033 |
| 11,117,658 | B2 * | 9/2021 | Neff | B64C 27/08 |
| 11,673,676 | B2 * | 6/2023 | Neff | B64D 27/04 |
| | | | | 244/17.13 |
| 11,820,496 | B2 * | 11/2023 | Cai | B64U 10/14 |
| 11,840,329 | B1 * | 12/2023 | Hinman | B64D 27/24 |
| 12,040,669 | B1 * | 7/2024 | Chong | B64D 27/24 |
| 12,202,633 | B2 * | 1/2025 | Cai | B64U 10/14 |
| 2004/0195436 | A1 * | 10/2004 | Sinclair | A63H 27/008 |
| | | | | 244/49 |
| 2011/0139923 | A1 * | 6/2011 | Papanikolopoulos | B64U 10/80 |
| | | | | 244/2 |
| 2014/0091172 | A1 * | 4/2014 | Arlton | B64U 50/19 |
| | | | | 244/17.23 |
| 2017/0075351 | A1 * | 3/2017 | Liu | H04N 23/685 |
| 2018/0101169 | A1 * | 4/2018 | Applewhite | G05D 1/104 |
| 2018/0327092 | A1 * | 11/2018 | Deng | B64C 39/024 |
| 2018/0354607 | A1 * | 12/2018 | Marot | B64U 50/19 |
| 2019/0256200 | A1 * | 8/2019 | Neff | B64D 27/24 |
| 2019/0329876 | A1 * | 10/2019 | Brunetti | B64C 27/12 |
| 2020/0140083 | A1 * | 5/2020 | Liu | B64U 30/293 |
| 2020/0172234 | A1 * | 6/2020 | Neff | B64C 37/00 |
| 2022/0388639 | A9 * | 12/2022 | Neff | B64D 31/06 |
| 2023/0139693 | A1 * | 5/2023 | Hofi | B64U 50/19 |
| | | | | 701/3 |
| 2023/0257126 | A1 * | 8/2023 | Neff | B64C 27/08 |
| | | | | 244/17.13 |
| 2023/0294828 | A1 * | 9/2023 | Arlton | B64C 39/024 |
| | | | | 244/17.23 |
| 2023/0365268 | A1 * | 11/2023 | Resnick | B64D 35/02 |
| 2024/0002079 | A1 * | 1/2024 | Zou | B64U 60/40 |
| 2024/0051657 | A1 * | 2/2024 | Abdallah | B64D 35/026 |
| 2024/0140627 | A1 * | 5/2024 | Mallikarjunan | B64C 27/605 |
| 2024/0286775 | A1 * | 8/2024 | Ho-Shing | F16H 37/00 |
| 2024/0343422 | A1 * | 10/2024 | Yao | B64U 50/27 |
| 2025/0019096 | A1 * | 1/2025 | Mayounove | B64U 10/14 |
| 2025/0019098 | A1 * | 1/2025 | Mayounove | B64U 30/24 |

* cited by examiner

[FIG 1]
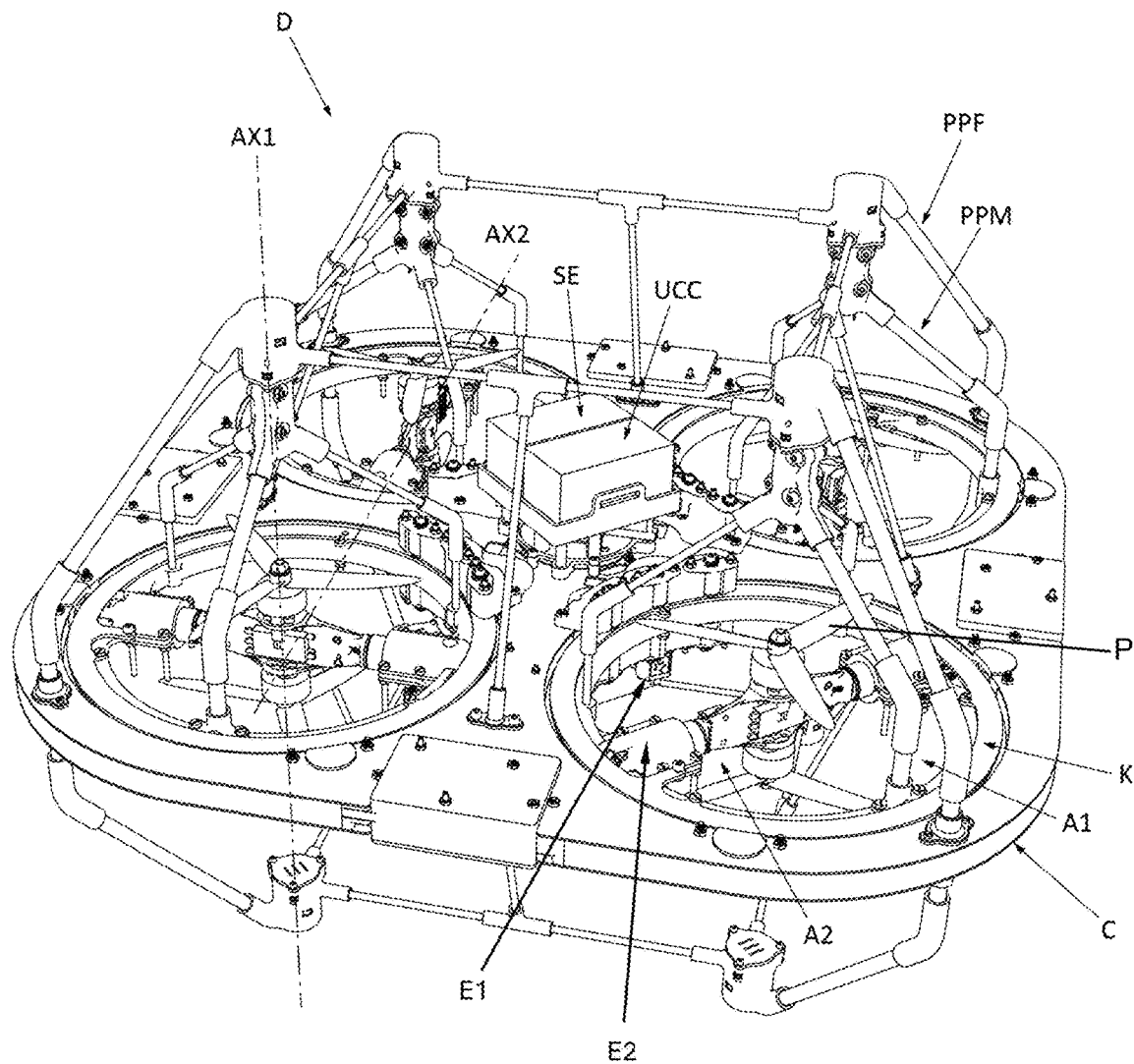

[Fig. 2]
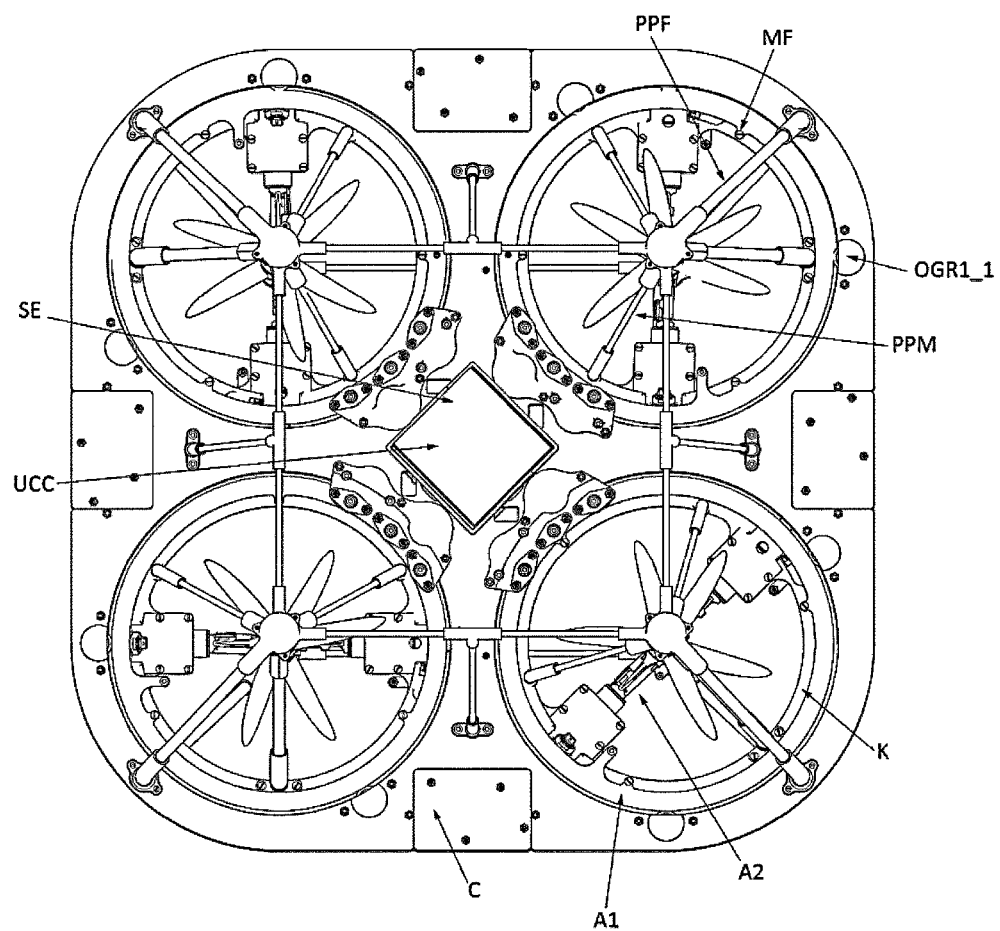

[Fig. 3]
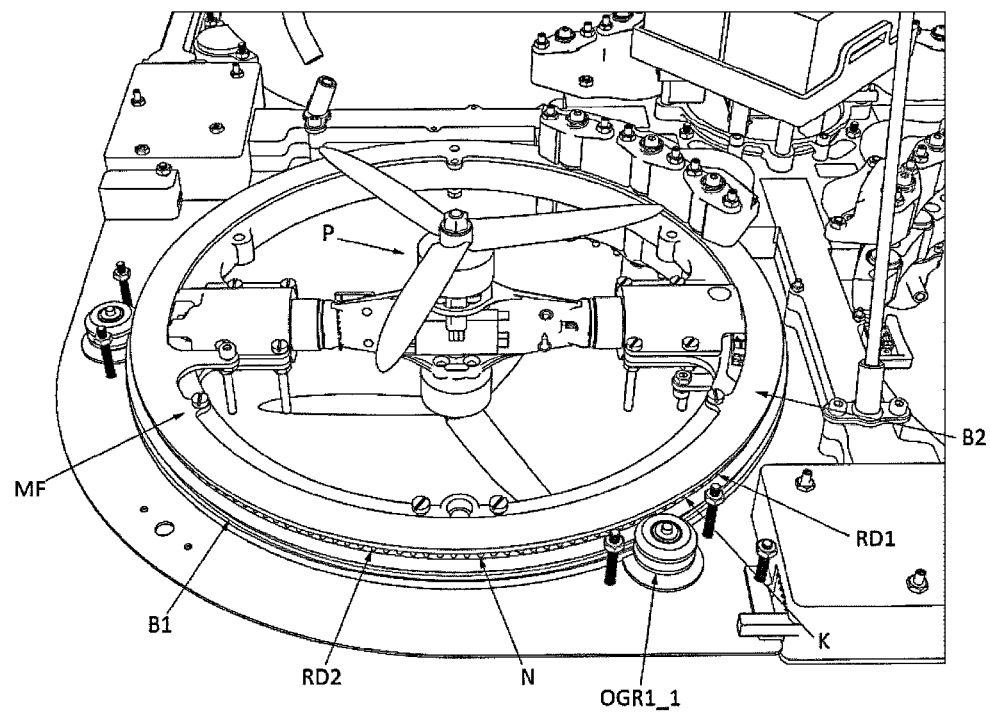

[Fig. 4]
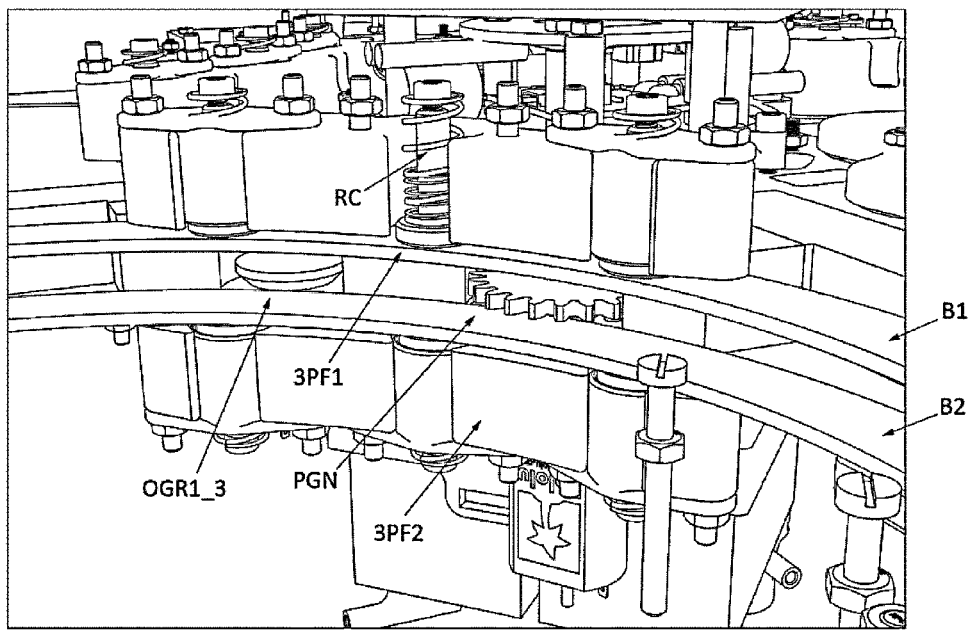

[Fig. 5]
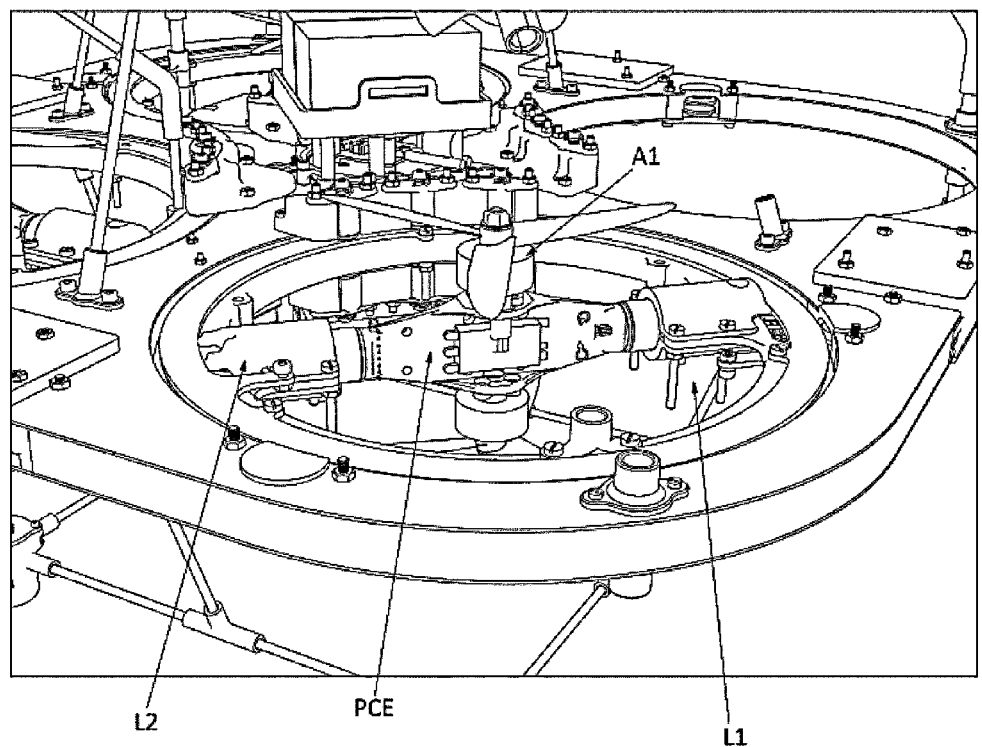

[Fig. 6A]
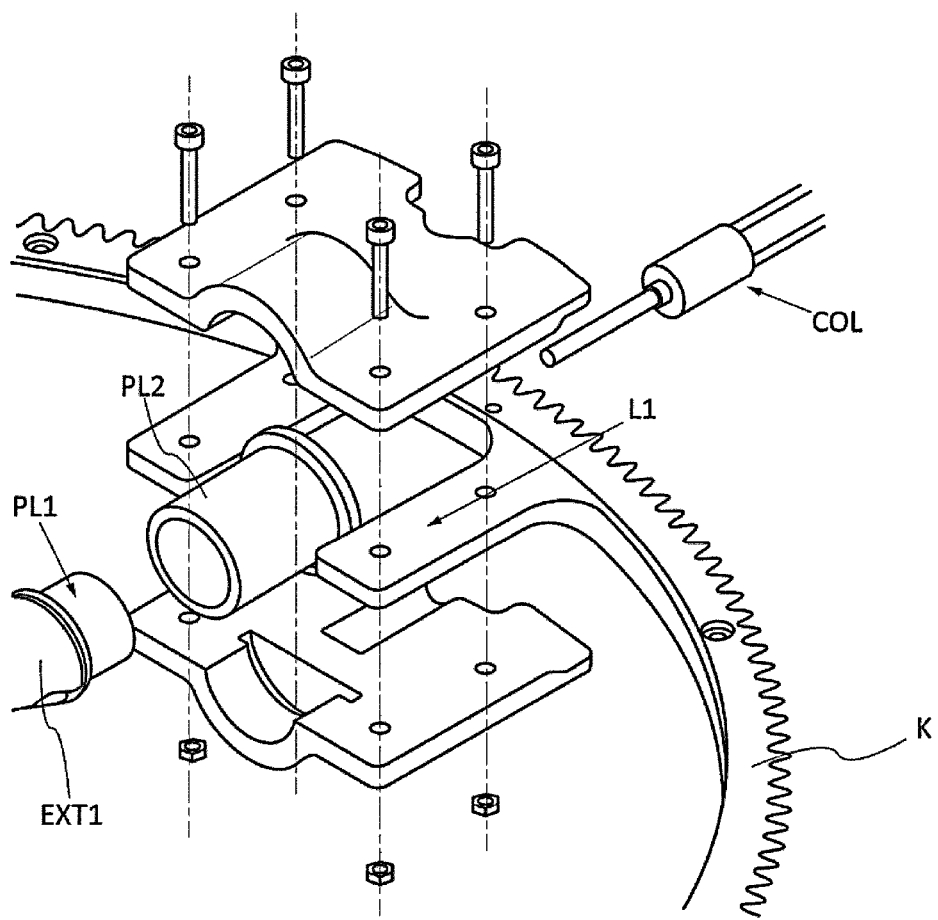

[Fig. 6B]
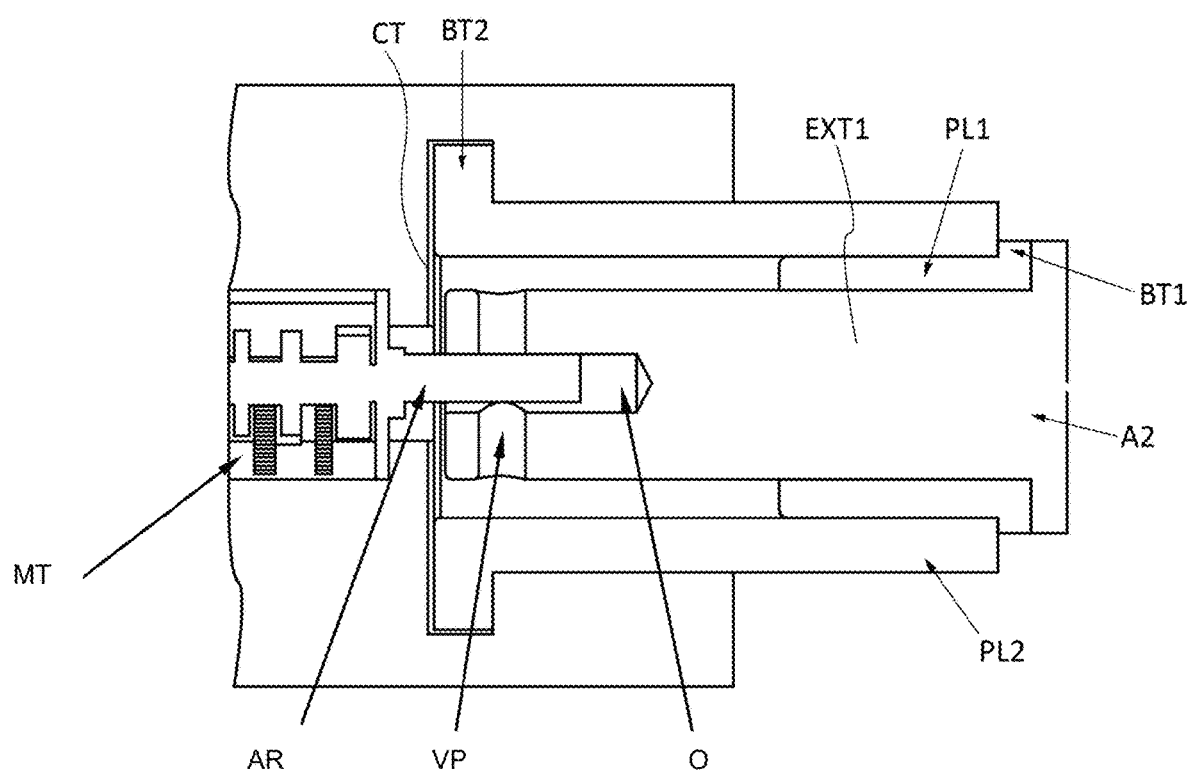

OMNIDIRECTIONAL PROPELLED VEHICLE WITH MINIMAL OVERALL DIMENSIONS

The invention relates the field of propelled vehicles, and in particular that of remotely piloted aerial vehicles, or drones. More specifically, the invention relates to a drone capable of controlling the direction of thrust generated by a propulsion unit in any spatial direction, while at the same time minimizing the footprint of the drone, in particular the steering control system.

A remotely piloted aerial vehicle, also known as a drone (unmanned aerial vehicle) or drone, comprises, in a known manner, multiple propulsion units, for example equipped with propellers or blades, mounted on a chassis. To control the direction of the drone, each propulsion unit can be fitted with an electric variable speed drive that can be remotely controlled, for example from a controller operated by a user. The direction of the drone can thus be controlled by increasing the rotational speed of the propellers of some propulsion units and/or decreasing the rotational speed of the propellers of other propulsion units.

While this type of drone technology does allow the direction of the drone to be controlled, it does not offer satisfactory drone handling, particularly over a wide range of speeds and/or movements. To overcome this drawback, it is also known practice to arrange each propulsion unit on a shaft that is pivotably mounted on the chassis, the shaft being able to be driven by a motor. The user is thus able to remotely control the motor of the shaft in order to modify the orientation of the propulsion unit and thereby control the direction of the drone.

Such a drone is described, for example, in US2018354607. This document discloses an omnidirectional drone comprising a propulsion unit mounted on a system of two mutually concentric, rotationally symmetrical shafts that are rotatably mounted on the chassis. The drone is characterized in that the axis of rotation of the first shaft is orthogonal to the axis of rotation of the second shaft. Thus, given a propulsion steering command, the shafts pivot about their respective axes of rotation so as to orient the propulsion unit according to said steering command.

In this type of architecture, the shaft pivoting on the chassis must be oriented so as to comply with the steering command for the propulsion unit, thereby increasing the overall dimensions of the drone when the propulsion unit is oriented in certain directions. This raises the question of how to reduce the overall dimensions of the drone without restricting its maneuverability in all directions in space.

These drawbacks are also found in the field of underwater drones, also known as AUVs (autonomous underwater vehicles), and more broadly in any vehicle fitted with a rotary propulsion unit that needs to be supplied with electricity.

There is therefore a need for an omnidirectional propelled vehicle that is easy to maneuver and has smaller overall dimensions than known omnidirectional propelled vehicles.

The present invention is placed in this context and aims to meet this need.

To these ends, one subject of the invention is a propelled vehicle comprising:
 a. a chassis,
 b. a first shaft comprising a crown that is rotationally symmetrical about a first axis, rotatably mounted on the chassis so as to rotate about the first axis of rotation,
 c. a first drive system connected to the first shaft and capable of rotating the first shaft about the first axis of rotation,
 d. characterized in that it comprises:
 e. a second shaft that is rotatably mounted on said first shaft so as to rotate about a second axis of rotation orthogonal to the first axis of rotation, the second shaft being supported at two separate points and on said first shaft, said points defining the second axis of rotation, and the second shaft supporting at least one propulsion unit of said propelled vehicle, and
 f. a second drive system connected to said second shaft and capable of rotating the second shaft about the second axis of rotation.

It is thus understood that the invention proposes using a system of shafts that cooperate mechanically with one another so as to be able to orient the propulsion unit of the propelled vehicle in any spatial direction. In addition, the structure of the system of shafts is arranged so as to minimize the overall dimensions of the propelled vehicle during a maneuver for orienting the propulsion unit by restricting the movement of both shafts to the same plane. Specifically, when the first shaft is rotated, the second shaft remains contained in the plane of rotation of the first shaft. Furthermore, when the second shaft is rotated about the second axis, the thrust force of the propulsion unit can be oriented in any direction through its center and orthogonal to said second axis. Thus, by combining the rotations of the two shafts, the propulsion unit can be oriented in any desired spatial direction without significantly increasing the overall dimensions of the propelled vehicle.

In the invention, the chassis can take the shape of a plate in which a space, for example a substantially circular space, is made in which the first shaft can rotate about the first axis of rotation. The chassis could, for example, be a stack of multiple layers including, for example, two central layers produced by 3D printing a polymer, in particular comprising polylactic acid (PLA) or a lower layer of another material, for example carbon or aluminum.

Advantageously, the propelled vehicle could comprise an electrical power source capable of meeting the power consumption needs of the propulsion unit of the propelled vehicle. For example, the electrical power source could be an electric battery housed in a receptacle in the chassis provided for this purpose. Where applicable, one or more electrical cables could be accommodated in a cavity provided between the central layers or in inserts provided in a central layer for routing the cables.

If desired, the chassis could comprise a plurality of spaces, in particular four spaces, and a plurality of, in particular four, first shafts, each supporting a propulsion unit and each driven by a first drive system, each being able to be rotatably mounted on the chassis in one of these spaces. Advantageously, each first shaft arranged in one of the spaces of the plurality of spaces could comprise a second rotatably mounted shaft supporting a propulsion unit, each driven by a second drive system.

Preferably, the second drive device could be accommodated in the first shaft, at one of the points where the second shaft is supported on the first shaft.

In one embodiment of the invention, the crown comprises a plurality of teeth arranged around at least some, in particular all, of its circumference and said first drive system comprises a pinion, or a gear or toothed wheel, that is driven by a motor and meshes with said teeth of the crown. According to this feature, rotation of a shaft of the motor will be transmitted to the crown via the pinion, gear or toothed wheel and the plurality of teeth, thereby simultaneously orienting the second shaft, the second axis and the direction of thrust of the propulsion unit.

In another, alternative or additional, embodiment of the invention, the first drive system comprises a belt driven by a motor and tensioned around the circumference of the crown. According to this feature, rotation of a shaft of the motor, on which is mounted a pulley on which the belt is tensioned, is transmitted to the crown via the belt, thereby simultaneously orienting the second shaft, the second axis and the direction of thrust of the propulsion unit.

Where applicable, the element of the first drive system that meshes with said plurality of teeth and said plurality of teeth can be electrically conductive and electrically connected to one another, said element being electrically connected to the electrical power source and said plurality of teeth being electrically connected to the propulsion unit. Alternatively, at least the belt, the pulley and the portion of the crown on which said belt is tensioned can be electrically conductive, the pulley and said portion of the crown being electrically connected to one another through the belt, the pulley being electrically connected to the electrical power source and said portion of the crown being electrically connected to the propulsion unit.

Advantageously, the propelled vehicle comprises a first rotational guide member for guiding the first shaft in rotation about the first axis, the rotational guide member being arranged so as to cooperate mechanically with the first shaft so as to remove at least one degree of freedom from said first shaft. This feature makes it possible both to prevent any misalignment of the first shaft, due in particular to the mechanical stresses to which the structure of the propelled vehicle is subjected over the course of a flight route, and for the rotational guide member to reduce the overall dimensions of the propelled vehicle by restricting the movement of the propulsion system.

Preferably, the first shaft comprises a first complementary member which is arranged so as to cooperate mechanically with the first rotational guide member in order to remove at least one degree of freedom from the first shaft. In other words, these members prevent the first shaft from moving in a given direction and/or from rotating about a given axis, this axis necessarily being separate from the first axis of rotation. The first rotational guide member and the first complementary member could cooperate so as to oppose movement of the first shaft in a direction parallel to the first axis of rotation and/or in a direction perpendicular to the first axis of rotation. It is possible to envisage the first rotational guide member cooperating with the first complementary member so as to remove multiple degrees of freedom from the first shaft. Alternatively or additionally, it is possible to envisage the chassis comprising a plurality of first rotational guide members, each cooperating with a first complementary member provided on the first shaft so as to remove a degree of freedom from the first shaft, it being understood that these first guide members and the first complementary members can all be structurally separate from one another and/or can remove different degrees of freedom with respect to one another and/or participate in the function of transmitting electrical power from the chassis to the first shaft.

Advantageously, the first rotational guide member and the first complementary member are electrically conductive and are electrically connected to one another, the first rotational guide member being electrically connected to the electrical power source and the first complementary member being electrically connected to the propulsion unit. It is thus understood that the invention proposes taking advantage of an element that is already present in the architecture of the propelled vehicle, namely a member for guiding the first shaft in rotation on the chassis, by giving it a second function of transmitting electrical power. Specifically, the rotational guide members present in a propelled vehicle, as well as the complementary members, can be made of an electrically conductive material, in particular bronze. These guide members may be direct-contact guide members, guide members that use a friction ring or surface coating, or guide members that use a rolling elements, such as roller bearings, other types of bearings or pads. These rotational guide members are furthermore necessarily in contact with the complementary members, along the first shaft, in order to be able to perform their guiding function. By electrically connecting a rotational guide member to the electrical power source of the propelled vehicle and the member complementary to this rotational guide member to the propulsion unit of the propelled vehicle, electrical power can therefore be transmitted from the chassis to the propulsion unit via this contact between the rotational guide member and the complementary member even when the orientation of the propulsion unit is changed as a result of rotation of the shaft without this taking up additional space.

In the invention, the first rotational guide member can be directly or indirectly electrically connected to the electrical power source, and the first complementary member can be directly or indirectly connected to the propulsion unit. The term "indirect electrical connection" may indicate, for example, that one or more elements can be electrically positioned between the electrical power source or the propulsion unit and the first rotational guide member or the first complementary rotational guide member, respectively. For example, a cable could be connected to an electric battery of the propelled vehicle and soldered to the first rotational guide member.

Advantageously, the propelled vehicle comprises a second rotational guide member for guiding the first shaft in rotation about said first axis of rotation, and the first shaft comprises a second complementary member arranged to mechanically cooperate with the second rotational guide member so as to remove at least one degree of freedom from the first shaft, the second rotational guide member and the second complementary member being electrically conductive and being electrically connected to one another, the second rotational guide member being electrically connected to the electrical power source and the second complementary member being electrically connected to the propulsion unit. According to this feature, it is possible to transmit an electric current, in particular an alternating or direct current, delivered by the electrical power source to the propulsion unit, the first rotational guide member-first complementary member pair forming, for example, a phase terminal, or a positive terminal, and the second rotational guide member-second complementary member pair forming, for example, a neutral terminal, or a negative terminal.

Advantageously, it is possible to envisage, for example, the second complementary member comprising a band mounted on the crown, on a face opposite the face on which the first complementary member is mounted, and the second rotational guide member comprising a pad bearing flat against said band of this second complementary member. Where applicable, the pads of the first and second rotational guide members could face one another. Preferably, the bands could be assembled on either side of the crown by means of the same screw, said screw being fitted with an insulating member around its periphery. This insulating member prevents the current from flowing directly from one band to the other. Alternatively, it is possible to make provision for the second complementary member to comprise a band mounted on the crown, on the same face supporting the first complementary member, the second complementary member being arranged concentrically with respect to the first complementary member, i.e. radially offset inward or outward with respect to this first complementary member. Where applicable, the second rotational guide member could comprise a pad bearing flat against said band of this second complementary member.

According to one, additional or alternative, embodiment of the invention, one from among the crown and the rotational guide member comprises a male element and the other from among the crown and the rotational guide member comprises a female element. According to this feature, the crown and the rotational guide member are coupled so as to ensure that the crown is guided in rotation. Thus, if the crown comprises the male element, then this will be accommodated in the female element of the rotational guide member. Conversely, if the crown comprises the female element, then this will accommodate the male element of said rotational guide member.

According to one additional embodiment of the invention, the male element is a rib formed around at least some of the circumference of the crown, and said rotational guide member comprises a part that is rotatably mounted so as to rotate about an axis that is substantially parallel to the first axis, which part is provided with a groove forming the female element. According to this feature, the rib is accommodated in the groove which, by virtue of its shape, holds the rib in place as the crown rotates about the first axis.

Advantageously, the rib can have a profile that is substantially complementary to the profile of the groove in said part. For example, the rib and groove could each have a trapezoidal profile, with the oblique faces of the rib bearing against the oblique faces of the groove in said part. According to this feature, the trapezoidal profile reduces friction between the rib and the rotational guide member, helping to save energy and reduce stress on the materials and thereby extend the service life of the propelled vehicle. Alternatively, said crown comprises at least one groove around at least some, in particular all, of its circumference, the groove forming the female element as well as the first complementary member, and the first rotational guide member comprises a part that is rotatably mounted on the chassis so as to rotate about an axis that is substantially parallel to the first axis and is provided with a rib forming the male element.

According to one example, the rib could be a central rib, positioned in a median portion of the outer surface of the crown. Where applicable, the crown could comprise a first plurality of teeth arranged above the central rib and a second plurality of teeth arranged below the central rib. In another embodiment, the rib could be an off-axis rib, positioned on an upper or lower edge of the outer surface of the crown. Where applicable, the crown could comprise two off-axis ribs, positioned respectively on an upper and a lower edge of the outer surface of the crown, the crown comprising a plurality of teeth arranged between the two ribs, and each rib fitting into a dedicated groove in the first rotational guide member.

Advantageously, the rotational guide member could comprise two rollers, in particular tapered rollers, one above the other and arranged so as to define a space between the rollers which forms said groove. Alternatively, the rotational guide member could comprise a bearing such as a grooved pulley.

In one alternative or additional embodiment of the invention, said crown comprises at least one rib around at least some, in particular all, of its circumference, the rib forming the male element, the first rotational guide member comprising a friction pad that is fixedly mounted on the chassis and provided with a groove forming the female element.

In one embodiment of the invention, the rotational guide member comprises an element that bears flat against a lower and/or upper surface of the crown. According to this feature, the flat-bearing element holds and guides the crown as it rotates.

Advantageously, the first complementary member comprises a band mounted on the crown and the first rotational guide member comprises a pad that bears flat against said band.

In one embodiment of the invention, the band is a section of a ring or a complete ring made of an electrically conductive material, in particular aluminum, the band being fixed, for example by screwing, to an upper or lower surface of the crown of the first shaft. Where applicable, it is possible to envisage the first complementary member comprising multiple bands distributed around the circumference of the crown of the first shaft. If desired, the band could be coated with a coating, in particular a film of electrically conductive grease or oil, which coats or impregnates either or both of the strip and/or the pad, and is positioned between the strip and the pad; in particular, the coating could be incorporated into the pad during the manufacture thereof. Preferably, at least one cable electrically connected to the electrical power source can be soldered to the pad. Alternatively, said cable could be inserted into a lug mounted on and electrically connected to the band.

Advantageously, the pad is made of an electrically conductive material, in particular bronze. The first rotational guide member could comprise multiple radially and/or longitudinally offset pads bearing flat against said band. Preferably, at least one cable electrically connected to the electrical power source can be soldered to the pad.

Advantageously, the first rotational guide member could also comprise a roller or a roller bearing, in particular radially offset behind the pad or longitudinally offset from the pad, and making contact with the crown of the first shaft or with the band. For example, the roller could be mounted on the chassis so as to rotate about an axis substantially parallel to the first axis of rotation, and can come into contact with a rib provided on the crown. Alternatively, the roller bearing could be rotatably mounted on the chassis so as to rotate about an axis that is substantially perpendicular to the first axis of rotation, and in particular passes through the center of the crown of the first shaft, and could make contact with an upper or lower face of the band.

If desired, the chassis, and in particular the first rotational guide member, comprises a module for pressing the pad onto the band. The pressing module is arranged so as to exert a force on the pad in the direction of the band. According to one example, the pad could comprise a rod, at the end of which a plate is formed, and the pressing module could comprise a guide part into which the rod of the pad fits and a compression spring which is arranged around the rod and butts, on the one hand, against a rim of the guide part and, on the other hand, against the plate of the pad. Alternatively, the pressing module could comprise a cavity that is open toward the band and in which the pad is accommodated, and at least one compression spring which is secured to the pad and to the bottom of the cavity.

Advantageously, the rotational guide member is attached to the chassis by screwing into an oblong hole. This feature allows the position of the rotational guide member to be adjusted over a continuous range of positions.

It is possible to envisage the chassis comprising a plurality of first rotational guide members, each cooperating with a complementary first member provided on the first shaft, for example one first rotational guide member comprising multiple pads bearing flat against a band mounted on the crown, and two tapered rollers one above the other and between which a peripheral rib of the crown is accommodated, and two other first guide members each comprising only two tapered rollers one above the other and between which the peripheral rib of the crown is accommodated, and two other first guide members each comprising only two tapered rollers one above the other and between which the peripheral rib of the crown is accommodated. Where applicable, it is possible to make provision for only part of one and/or only one, or some, of these first rotational guide member-first complementary member pairs to be electrically conductive and/or electrically connected to the electrical power source and to the propulsion unit.

In one embodiment of the invention, the propelled vehicle comprises a plurality of fixed legs which extend from the chassis to a common base to which they are attached, and a plurality of movable legs which extend from a movable base, which is rotatably mounted on the common base so as to rotate about the first axis of rotation, to the crown to which they are attached. This feature allows the first shaft to be held suspended and allows the thrust from the propulsion unit to be transferred to the entire propelled vehicle as it moves.

Advantageously, the propelled vehicle comprises a central control unit for the propelled vehicle which is capable of exchanging data with the propulsion unit. Where applicable, a rotary collector is arranged in the common base and in the movable base, with at least one cable extending from the central control unit to the rotary collector via one of the fixed legs and another cable extending from the rotary collector to the propulsion unit via one of the movable legs. This embodiment is particularly advantageous when the first shaft is a crown, as this set of legs makes it possible to ensure that the first shaft is held in place on the chassis, the first shaft thus being suspended in the space provided in the chassis and in which the first shaft can rotate. This tubular support structure can thus be used to route cables therethrough for data exchange between the central control unit and the propulsion unit. The common base and the movable base form a common hollow part in which the rotary collector is arranged. Since this type of rotary collector allowing a fixed portion, on the common base, to be electrically connected to a rotating portion, on the movable base, is known per se, it will not be described in any more detail.

Preferably, the central control unit of the propelled vehicle is able to exchange data with one or more sensors of the propulsion unit, such as an inertial measurement unit, and/or with a variable speed drive of one or more motors of the propulsion unit.

Advantageously, the fixed legs are attached to the chassis and distributed around the entire periphery of the chassis space in which the first shaft can rotate about the first axis of rotation. Again advantageously, the movable legs are attached to the crown of the first shaft and distributed around the entire periphery of this crown. Preferably, the fixed and movable legs are arranged so that the common base and the movable base overhang the crown and are positioned on the first axis of rotation.

Advantageously, the second drive device comprises a motor provided with a rotary shaft that rotates about the second axis of rotation; the second shaft comprises a transmission member that is mechanically connected to the rotary shaft of the motor so that rotation of the shaft of the motor is transmitted to the second shaft; the first complementary member of the second shaft comprises a first bearing which is mounted on the transmission member of the second shaft and the first rotational guide member of the first shaft comprises a second bearing which is mounted concentrically around the first bearing.

Advantageously, the first bearing and the second bearing are electrically conductive and are electrically connected to one another. This configuration considerably reduces the size and weight of the components involved in transmitting electrical power to the propulsion unit.

Advantageously, the first bearing could be a ring or sleeve made of an electrically conductive material, in particular bronze and, for example, sintered bronze impregnated with a lubricant such as electrically conductive, or non-conductive, grease, with a longitudinal axis that is substantially identical to the second axis of rotation, and mounted in a fixed manner on the transmission member of the second shaft which is fitted into this first bearing. Where applicable, at least one cable electrically connected, directly or indirectly, to the propulsion unit can be soldered to the first bearing. Alternatively, said cable can be inserted into a lug mounted on and electrically connected to the first bearing.

Preferably, the second bearing could be a ring or sleeve made of an electrically conductive material, in particular bronze, with a longitudinal axis that is substantially identical to the second axis of rotation, and mounted freely or fixedly on the first shaft and with a diameter substantially greater than that of the first bearing. Where applicable, at least one cable electrically connected to the electrical power source can be soldered to the second bearing. Alternatively, said cable can be inserted into a lug mounted on and electrically connected to the first bearing.

Advantageously, the inner surface of the second bearing and the outer surface of the first bearing are smooth and in direct contact with one another. Alternatively, a coating, in particular a film of electrically conductive grease or oil coating or impregnating either or both of the bearings, can be positioned between the inner surface of the second bearing and the outer surface of the first bearing; in particular, the coating could be incorporated into the pad during the manufacture thereof.

Advantageously, the propelled vehicle comprising a central control unit for the propelled vehicle which is capable of exchanging data with the propulsion unit, the second shaft comprises two diametrically opposed pivots, each pivotably mounted in a recess in the first shaft, said recesses facing one another, the transmission member of the second shaft is arranged on one of the pivots of the second shaft to extend into one of said recesses and the rotary shaft of the motor extends into this recess, a rotary collector is arranged in the other of the recesses in the first shaft, and at least one cable extends from the central control unit to the rotary collector through the first shaft and another cable extends from the rotary collector to the propulsion unit through the second shaft. Preferably, said rotary collector could be connected to the central control unit of the propelled vehicle for example via the rotary collector provided in the common base and the movable base.

According to one example, the crown of the first shaft comprises two tabs that are oriented radially toward the inside of the crown, the tabs being diametrically opposed, each tab accommodating one of the points where the second shaft is supported on the first shaft. Advantageously, each tab is arranged so as to define, by virtue of its structure, a recess suitable for accommodating a mechanical structure. In particular, a mechanical structure could be attached to the recess defined by the tabs by means of a screw, adhesive or other attachment means. Preferably, the second drive system could be mounted on one of said tabs. Where applicable, the rotary collector could be mounted on the other of said tabs. Provision could advantageously be made for two protective half-shells to be attached on either side of each tab in order to define the recesses for the first shaft.

In one embodiment of the invention, the second drive system comprises a transmission cylinder of polygonal cross section which is driven by a motor and is inserted into an opening in the second shaft, the cross section of which is complementary to that of the transmission cylinder, the connection between the transmission cylinder and the opening in the second shaft forming one of the points where the second shaft is supported on the first shaft. According to this feature, rotation of the shaft of the motor is transmitted to the second shaft; in addition, the polygonal cross section of the cylinder increases efficiency in the transmission of motor torque by increasing the contact area between the transmission cylinder and the connection.

In another, alternative or additional, embodiment of the invention, the second drive system comprises a drive belt driven by a motor, which belt is tensioned on a pulley mounted on the second shaft. According to this feature, rotation of the shaft of the motor, on which is mounted the pulley on which the belt is tensioned, is transmitted to the second shaft, thereby simultaneously orienting the propulsion unit and the direction of thrust of the propulsion unit.

Advantageously, the second shaft comprises two diametrically opposed pivots, each pivotably mounted in a recess in the first shaft, said recesses facing one another. Where applicable, the second bearing comprises a peripheral stop, in particular extending around the entire periphery of the second bearing and preferably formed at an edge of the second bearing, and the recess comprises a peripheral groove in which the peripheral stop of the second bearing is accommodated. This peripheral stop and this peripheral groove make it possible to block the translation of the second shaft in a direction perpendicular to the second axis of rotation and in any direction coplanar with said second axis of rotation.

Preferably, the first bearing comprises a peripheral stop, in particular extending around the entire periphery of the first bearing and preferably formed at an edge of the first bearing. Where applicable, the peripheral stop of the first bearing can face a peripheral rim of the recess and/or be clamped between the peripheral stop of the second bearing and a rim of the second shaft provided in line with the transmission member of the second shaft. These features make it possible to reinforce the blocking of the translation of the second shaft in the direction perpendicular to the second axis of rotation and in any direction coplanar with the second axis of rotation. Alternatively, the peripheral stop of the second bearing so as to butt against a wall of the recess and the peripheral stop of the first bearing can be positioned opposite the peripheral stop of the second bearing and butt against a wall of the second shaft opposite the wall of the recess. In other words, the bearings are clamped, via their stops, between opposing walls of the recess and the second shaft.

In one additional embodiment of the invention, the motor comprises a rotary shaft that is inserted into the transmission cylinder, a set screw being screwed into a tapped hole in the transmission cylinder in order to secure the transmission cylinder to the rotary shaft of the motor. According to this feature, rotation of the shaft of the motor can be suitably transmitted to the transmission cylinder, the set screw ensuring friction between the cylinder and the shaft of the motor.

Alternatively, the transmission cylinder could be circular in cross section, and truncated to form a flat surface. Where applicable, the motor could comprise a rotary shaft that rotates about the first axis of rotation and is inserted into the transmission cylinder, a set screw being screwed into a tapped hole in the transmission cylinder, provided in line with the cavity in the transmission cylinder into which the rotary shaft of the motor is inserted, in order to secure the transmission cylinder to the rotary shaft of the motor. Alternatively, it is possible to envisage the transmission member comprising a portion of polygonal cross section which is inserted into an opening of complementary cross section made in the transmission cylinder.

In one embodiment of the invention, the second shaft comprises a central part supporting the propulsion unit and two rods extending, along the second axis of rotation, on either side from the central part to a point where the second shaft is supported on the first shaft. According to this feature, the propulsion unit is connected to the chassis of the propelled vehicle and can then transmit thrust in order to move the propelled vehicle.

Preferably, the propulsion unit comprises propellers driven by a motor rotating about a third axis of rotation perpendicular to the second axis of rotation. According to this feature, it is possible to direct the thrust of the propulsion unit in any spatial direction through the center of the propulsion unit.

Advantageously, the second shaft supports two propulsion units mounted on either side of said second shaft, each propulsion unit being fitted with propellers, the propellers of the propulsion units being contra-rotating propellers. According to this feature, a greater thrust force could be obtained while simultaneously eliminating the torque which is responsible for the gyroscopic effect.

In one embodiment of the invention, the propelled vehicle is an omnidirectional aerial drone.

Provision could be made for the propulsion unit to be a blade- or propeller-based propulsion unit, a reaction turbine, or more generally any type of propulsion unit of which the orientation can be controlled by pivoting it and which requires an electrical power supply, in particular provided with a rotor and a stator.

Other advantages and features of the present invention are now described with the aid of examples that are purely illustrative and in no way limit the scope of the invention, and based on the attached drawings, in which:

FIG. 1 schematically and partially shows a perspective view of an omnidirectional drone according to one embodiment of the invention;

FIG. 2 schematically and partially shows a top view of the omnidirectional drone of [FIG. 1];

FIG. 3 schematically and partially shows one perspective view of a portion of the omnidirectional drone of [FIG. 1];

FIG. 4 schematically and partially shows a perspective view of a set of rotational guidance members and of complementary members of the omnidirectional drone of [FIG. 1];

FIG. 5 schematically and partially shows another perspective view of the portion of the omnidirectional drone of [FIG. 3];

FIG. 6A schematically and partially shows a cross-sectional view of one connection between two shafts of the omnidirectional drone of [FIG. 1]; and FIG. 6B schematically and partially shows an exploded view of another connection between two shafts of the omnidirectional drone of [FIG. 1].

In the following description, identical elements, by structure or function, appearing in different figures retain, unless otherwise specified, the same references.

FIG. 1 shows a propelled vehicle in the form of an omnidirectional drone D comprising a chassis C on which four spaces are arranged, each space supporting a first shaft A1 comprising a crown K that is rotationally symmetrical about a first axis of rotation AX1 and mounted so as to rotate about said first axis AX1. Each crown K supports a second shaft A2 that is mounted so as to rotate about a second axis AX2, orthogonal to the first axis AX1, and on which a propeller P is mounted which comprises, in particular, a double contra-rotating propeller. The center of the chassis C supports a central control unit UCC which is able, in particular, to control the rotational speeds of the propulsion units P, and an electric battery SE which is arranged, in particular, to supply the propulsion system of the drone C with power. The chassis C also comprises a first drive system E1 for each first shaft A1 which is mounted on the chassis C.

FIG. 2 shows a top view of the omnidirectional drone D; [FIG. 3] shows a perspective view of a first shaft-second shaft-propeller assembly A1-A2-P of the omnidirectional drone of [FIG. 1]; [FIG. 4] shows one perspective view of a set of rotational guide members and of complementary members of the assembly of [FIG. 3]; [FIG. 5] shows another perspective view of the first shaft-second shaft-propeller A1-A2-P assembly of [FIG. 3]; [FIG. 6A] shows a cross-sectional view of one connection between the first shaft A1 and the second shaft A2 of the assembly of [FIG. 3]; and [FIG. 6B] shows an exploded view of another connection between the first shaft A1 and the second shaft A2 of the assembly of [FIG. 3]. In the following, only one of these assemblies will be described, it being understood that the four assemblies visible in [FIG. 1] and FIG. 2 are identical.

The drone D comprises a plurality of fixed legs PPF which extend from the chassis C to a common base supported by the chassis C to which they are attached, and a plurality of movable legs PPM which extend from a movable base rotatably mounted on the common base so as to rotate about the first axis of rotation AX1. The movable legs PPM are attached to the first shaft A1 and are distributed around its entire circumference. The first shaft A1 is thus suspended in the space reserved for it while remaining rotatable about the first axis of rotation AX1.

As shown in [FIG. 3], the crown K comprises a first plurality of teeth RD1 around its entire circumference, arranged on an upper rim of the crown K, and a second plurality of teeth RD2 around its entire circumference, arranged on a lower rim of the crown K.

The first drive system E1 comprises a motor driving a pinion PGN, visible in [FIG. 4]. This pinion PGN comprises two toothed regions which are parallel to one another and are arranged around the entire portion of an upper rim of the circumference of the pinion PGN and around the entire lower portion of a rim of the circumference of the pinion. Each of these two toothed regions is arranged so as to mesh with the plurality of upper and lower teeth RD1 and RD2 of the crown K such that the rotation of the pinion PGN brought about by the motor is transmitted to the crown K and consequently to the shaft A1. The shaft A1 thus pivots about the axis of rotation AX1, which is identical to the axis of revolution of the crown K.

The crown K comprises a central rib N around the entire median portion of its circumference, arranged between the first and second plurality of teeth RD1 and RD2. The chassis C comprises two first guide members OGR1_1 which each take the form of a grooved bearing of which the profile is complementary to the geometry of the rib N. The rib N is accommodated in the groove of each bearing OGR1_1, thus forming a first complementary member OC1_1 cooperating mechanically with the first guide members OGR1_1. In the example described, the rib N and the groove of each bearing OGR1_1 have a trapezoidal profile, with the oblique faces of the rib N bearing against the oblique faces of this groove.

As shown in [FIG. 3], the crown K of the first shaft A1 is surrounded by two parallel rings, B1 and B2, which are fitted to the upper and lower faces of the crown K. These rings, B1 and B2, are rotationally symmetrical about the axis AX1, and are securely mounted on the crown K by means of attachment means MF at various points on the first shaft A1. In the example described, the attachment means take the form of screws that are screwed through each of the bands B1 and B2 and the crown K.

As shown in [FIG. 4], the chassis C comprises another first rotational guide member OGR1_2 comprising a plurality of friction pads 3PF1, taking form of three consecutive pads. These pads 3PF1 bear flat against the upper ring B1, which thus forms another first complementary member OC1_2 cooperating with the other first rotational guide member OGR1_2.

Each friction pad 3PF1 comprises a rod and a plate provided at the end of the shaft in order to bear flat against the upper ring B1. The rod is mounted in a guide cylinder and a compression spring RC is arranged around the rod so as to butt, on the one hand, against an upper wall of the guide cylinder and, on the other hand, against the plate of the pad. Each pad 3PF1 thus exerts a force in a direction perpendicular to the surface of the ring B1 toward the ring B2.

Symmetrically, the chassis C comprises a second rotational guide member OGR2 comprising a plurality of friction pads 3PF2, which are arranged opposite the pads 3PF1. These pads 3PF2 bear flat against the lower ring B2, which thus forms a second complementary member OGR2 cooperating with the second rotational guide member OGR2.

In this way, the first shaft A1 is guided in rotation simultaneously by the first guide members OGR1_1 and OGR1_2 and by the second guide member OGR2.

The presence of a third grooved bearing OGR1_3, provided behind the friction pads 3PF1 and 3PF2 and cooperating with the rib N of the crown K, will be noted.

As shown in [FIG. 3], the bands B1 and B2 are made of an electrically conductive material, in this case aluminum. Similarly, the friction pads 3PF1 and 3PF2 are made of an electrically conductive material, in this case bronze.

Each band B1 and B2 is thus connected to the battery SE of the drone D via electrical contact with the friction pads, 3PF1 and 3PF2. Each pad 3PF1 and 3PF2 is electrically connected to the battery SE by a cable, in particular soldered to the rod of this pad, this cable being routed, for example, through cavities in the chassis C and/or between two inner layers of this chassis C. Each band B1 and B2 is electrically connected to the propulsion unit P, as will be described later on. One of the bands B1 can thus act as a positive terminal or phase terminal, and the other band B2 can thus act as a negative terminal or neutral terminal, depending on whether the electrical power source SE delivers direct or alternating current.

As shown in [FIG. 5] and [FIG. 6B], the crown K of the first shaft A1 comprises two tabs L1 and L2 which are oriented radially toward the inside of the crown K, the tabs being diametrically opposed. Each tab L1 and L2 thus defines a recess that accommodates one of the ends EXT1 and EXT2 of the second shaft A2, such that this end is pivotably connected with respect to this recess. The tabs L1 and L2 thus define the second axis of rotation AX2. In the example described, each tab comprises an upper half-shell and a lower half-shell (these are visible in [FIG. 6A]), the half-shells together defining the cavity for accommodating one end of the shaft A2.

As shown in [FIG. 6A], at the tab L1 and a first end EXT1 of the second shaft A2, the first shaft A1 supports a second drive system E2 capable of pivoting the second shaft A2 about the second axis of rotation AX2. The second drive system E2 comprises a transmission cylinder CT with a polygonal, in this case hexagonal, cross section, which is driven by a motor and is inserted into an opening OR provided in the first end EXT1 of the second shaft A2, the cross section of which is complementary to that of the transmission cylinder CT. It will be noted that this first end EXT1 thus forms a member for transmitting the rotation of the motor of the second drive system E2 to the second shaft A2.

As shown in [FIG. 6A] and [FIG. 6B], the second shaft A2 comprises, at each of its ends EXT1 and EXT2, a first bearing PL1, in this case a sleeve bearing, into which this end is fixedly fitted. For each tab L1 and L2, the first shaft A2 comprises a second bearing PL2, also in the form of a sleeve bearing, which is freely arranged in the recess defined by this tab. The second bearing PL2 is arranged concentrically around the first bearing PL1, the inner surface of the second bearing PL2 and the outer surface of the first bearing PL1 being smooth and in direct contact with one another. The second bearing PL2 of the tab L1 thus forms a first rotational guide member DOGR_1 for the second shaft A2 and the first bearing PL1 of the end EXT1 thus forms a first complementary member DOC_1 which mechanically cooperates with the first member DOGR_1, while the second bearing PL2 of the tab L2 forms a second rotational guide member DOGR_2 for the second shaft A2 and the first bearing PL1 of the end EXT2 thus forms a second complementary member DOC_2 which mechanically cooperates with the second member DOGR_2.

Each first bearing PL1 and each second bearing PL2 is made of an electrically conductive material, in particular bronze. For each end EXT1 and EXT2, one cable (not shown), electrically connected to the propulsion unit P, is soldered to the first bearing PL1, while another cable, electrically connected to the upper ring B1 or lower ring B2, is soldered to the second bearing PL2. The electrical power delivered by the battery SE can thus be transmitted to the propulsion unit P via the pads 3PF1 and 3PG2, the rings B1 and B2, the first bearings PL1 and the second bearings PL2.

Each second bearing PL2 comprises a peripheral stop BT2 formed on an edge of the second bearing PL2, and the recess in each tab L1 and L2 comprises a peripheral groove GP, visible in [FIG. 6A] and [FIG. 6B], in which the peripheral stop BT2 of the second bearing PL2 is accommodated. The first bearing PL1 comprises a peripheral stop BT1 formed on an edge of the first bearing PL1, this stop BT2 being clamped between a wall of the second shaft A2 and an edge of the second bearing PL2.

The second shaft A2 comprises a central part PCE, visible in [FIG. 5], which supports the propulsion unit (P) and two rods that extend, along the second axis of rotation A2, on either side from the central part PCE to form the ends EXT1 and EXT2.

Lastly, one rotary collector (not shown) is arranged in the common base and in the movable base connecting the fixed legs PPF to the movable legs PPM, while another rotary collector COL is arranged in the recess in the tab L2 of the first shaft A1 accommodating the second end EXT2 of the second shaft.

At least one cable (not shown) connects the central control unit UCC to this rotary collector through one of the fixed legs PPF, while another cable extends from this rotary collector to the other rotary collector COL through one of the movable legs PPM and inside the first shaft A1, for example inside a cavity in the crown K. Finally, a cable connects this rotary collector COL to the propulsion unit P through a cavity provided in the second shaft A2.

It will be noted that the invention has been described in the context of an omnidirectional aerial drone, but it can be extended to other types of drone, such as an underwater drone or AUV, or to other types of propelled vehicle, which might or might not be remotely controllable, such as a car, motorcycle, truck, bicycle, train, airplane, helicopter or ship.

The foregoing description clearly explains how the invention achieves its set objectives, namely reducing the overall dimensions of the propulsion system of an omnidirectional propelled vehicle by providing a system of shafts that are rotatably mounted on the chassis of the propelled vehicle and are arranged such that the movement of the first shaft is restricted by rotational guide members and the second shaft, which supports a propeller, is rotatably mounted on said first shaft, the shafts being driven by first and second drive systems, respectively.

In any case, the invention is not limited to the embodiments specifically described in this document, and extends in particular to any equivalent means and to any technically operative combination of these means. In particular, it is possible to envisage other structural materials, in particular electrically conductive materials and magnetic guide elements, in particular electromagnets. Similarly, an arbitrary number of propulsion units can be rotatably mounted on the second shafts so as to modify the total thrust force of the propelled vehicle and, consequently, the maximum speed attainable by this propelled vehicle.

The invention claimed is:
1. A propelled vehicle (D) comprising:
   a. a chassis (C),
   b. a first shaft (A1) comprising a crown (K) that is rotationally symmetrical about a first axis (AX1), rotatably mounted on the chassis (C) so as to rotate about said first axis of rotation (AX1),
   c. a first drive system (E1) connected to the first shaft (A1) and capable of rotating the first shaft about the first axis of rotation (AX1),
   d. a second shaft (A2) that is rotatably mounted on said first shaft (A1) so as to rotate about a second axis of rotation orthogonal to the first axis of rotation (AX1), the second shaft (A2) supported at two separate points (X1) and (X2) on said first shaft (A1), said points defining the second axis of rotation, and the second shaft supporting at least one propulsion unit (P) of said propelled vehicle (D), wherein the first shaft (A1) and the second shaft (A2) are configured to constrain movement of the propulsion unit (P) to a single plane during orientation changes to minimize the overall dimensions of the propelled vehicle, and
   e. a second drive system (E2) connected to said second shaft (A2) and capable of rotating the second shaft about the second axis of rotation.
2. The propelled vehicle as claimed in claim 1, wherein said crown (K) comprises a plurality of teeth (RD1) that are arranged around at least some of crown (K)'s circumference and in that said first drive system (E1) comprises a pinion (PGN) that is driven by a motor and meshes with said teeth (RD1) of the crown (K).

3. The propelled vehicle as claimed in claim 1, wherein the first drive system (E1) comprises a belt driven by a motor and tensioned around the circumference of said crown (K).

4. The propelled vehicle as claimed in claim 1 further comprising a member (OGR) for guiding the first shaft (A1) in rotation about the first axis (AX1) about the first axis (AX1), the rotational guide member (OGR) arranged so as to cooperate mechanically with the first shaft so as to remove at least one degree of freedom from said first shaft (A1).

5. The propelled vehicle as claimed in claim 4, wherein one element from among the crown (K) and the rotational guide member (OGR) comprises a male element (M) and in that the other, from among the crown (K) and the guide member (OGR), comprises a female element.

6. The propelled vehicle as claimed in claim 5, wherein said crown (K) comprises at least one rib (N) around at least some of crown (K)'s circumference, the rib forming the male element, and in that said rotational guide member (OGR) comprises a part that is mounted so as to rotate about an axis that is substantially parallel to the first axis of rotation (AX1), which part is provided with a groove (G) forming the female element.

7. The propelled vehicle as claimed in claim 4, wherein the rotational guide member (OGR) comprises an element that bears flat against a lower or upper surface of the crown (K).

8. The propelled vehicle as claimed in claim 4, wherein the rotational guide member (OGR) is attached to the chassis (C) by screwing into an oblong hole.

9. The propelled vehicle as claimed in claim 1, further comprising a plurality of fixed legs (PPF) which extend from the chassis (C) to a common base (EC) to which they are attached and a plurality of movable legs (PPM) which extend from a movable base (EM), which is rotatably mounted on the common base (EC) so as to rotate about the first axis of rotation (AX1), to the crown (K) to which they are attached.

10. The propelled vehicle as claimed in claim 1, wherein the crown (K) comprises two tabs (L), (L1) and (L2), which are oriented radially toward the inside of the crown, the tabs (L) diametrically opposed, each tab (L) accommodating one of the points where the second shaft (A2) is supported on the first shaft (A1).

11. The propelled vehicle as claimed in claim 1, wherein the second drive system (E2) comprises a transmission cylinder (CT) of polygonal cross section which is driven by a motor (MT) and is inserted into an opening (O) in the second shaft (A2), the cross section of which is complementary to that of the transmission cylinder, the connection between the transmission cylinder and the opening in the second shaft (A2) forming one of the points where the second shaft is supported on the first shaft (A1).

12. The propelled vehicle as claimed in claim 11, wherein the motor comprises a rotary shaft (AR) that is inserted into the transmission cylinder (CT), a set screw (VP) screwed into a tapped hole in the transmission cylinder (CT) in order to secure the transmission cylinder (CT) to the rotary shaft of the motor.

13. The propelled vehicle as claimed in claim 1, wherein the second shaft (A2) comprises a central part (PC) which supports the propulsion unit (P) and two rods, (T1) and (T2), which extend, along the second axis of rotation (AX2), on either side from the central part (PC) to a point where the second shaft (A2) is supported on the first shaft (A1).

14. The propelled vehicle as claimed in claim 1, wherein the second shaft (A2) supports two propulsion units (P) mounted on either side of said second shaft (A2), each propulsion unit (P) provided with propellers, the propellers of the propulsion units being contra-rotating propellers.

15. The propelled vehicle (D) as claimed in claim 1, wherein said propelled vehicle is an omnidirectional aerial drone.

* * * * *